(12) United States Patent
Gallant

(10) Patent No.: US 6,259,782 B1
(45) Date of Patent: Jul. 10, 2001

(54) ONE-NUMBER COMMUNICATIONS SYSTEM AND SERVICE INTEGRATING WIRELINE/WIRELESS TELEPHONE COMMUNICATIONS SYSTEMS

(75) Inventor: John Kenneth Gallant, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/071,951

(22) Filed: May 4, 1998

(51) Int. Cl.[7] .................................................. H04M 3/42
(52) U.S. Cl. .......................... 379/211; 379/219; 455/417; 455/461
(58) Field of Search .................................... 379/201, 207, 379/210, 211, 212, 213, 219, 220, 221, 243; 455/414, 417, 428, 433, 445, 461

(56) References Cited

U.S. PATENT DOCUMENTS

| | | | |
|---|---|---|---|
| 5,353,331 | 10/1994 | Emery et al. | 379/58 |
| 5,592,533 | 1/1997 | McHenry et al. | 379/58 |
| 5,598,458 | 1/1997 | Bales et al. | 379/58 |
| 5,664,005 | 9/1997 | Emery et al. | 455/422 |
| 5,828,736 | * 10/1998 | Chevion | 379/100.13 |
| 5,920,815 | * 1/2000 | Akhavan | 455/426 |
| 5,978,672 | * 10/1998 | Hartmaier et al. | 455/413 |
| 5,991,365 | * 11/1999 | Pizano et al. | 379/88.13 |
| 6,018,573 | * 1/2000 | Tanaka | 379/211 |

OTHER PUBLICATIONS

Richard B. Robrock II, Fellow, IEEE, The Intelligent Network—Changing the Face of Telecommunications, Proceedings of the IEEE, vol. 79, No. 1, Jan. 1991, pp. 7–20.

Jean S. Doyle and Cathy S. McMahon The Intelligent Network Concept, IEEE Transactions on Communications, vol. 36, No. 12, Dec. 1988, pp. 1296–1301.

\* cited by examiner

*Primary Examiner*—Scott L. Weaver

(57) ABSTRACT

A one-number communications service system for a subscriber that allows completion of calls to designated wireless or wireline communications terminals through the use of a single assigned telephone number. The system includes a local wireline switch that is coupleable to a wireline terminal, and a wireless switch that is coupleable to a wireless terminal. A switched telephone network is coupled between the switches to thereby define a combined switching arrangement for directing and completing a call to and from the terminals upon receiving routing instructions. A data signaling network is coupled to the combined switching arrangement for controlling switching operations when the call is made. A database management system is coupled to the data signaling network and accessible to the switches. The database management system includes a telephone number assigned for use by the subscriber and routing instructions assigned to the telephone number for allowing access to the terminals. The wireline switch includes a mechanism for sending a request message requesting routing instructions from the database management system for completing the call to the telephone number. Lastly, the database management system includes a mechanism for sending a response message to the wireline switch containing the routing instructions for completing the call to at least one of the terminals.

20 Claims, 7 Drawing Sheets

ONE-NUMBER COMMUNICATIONS SYSTEM AND SERVICE INTEGRATING WIRELINE/WIRELESS TELEPHONE COMMUNICATIONS SYSTEMS

FIELD OF THE INVENTION

The present invention relates to wireline/wireless telephone communications systems and more particularly pertains to allowing a subscriber to receive calls to designated wireless or wireline communications terminals through the use of a single assigned telephone number with a one-number communications system and service.

DESCRIPTION OF THE PRIOR ART

The Advanced Intelligent Network (AIN) provides a service-independent platform for telephone service creation, customization, and control. The AIN provides these services to subscribers through use of a variety of switching systems and architectures. In an AIN-type system, central or end office switches send and receive data messages from an intelligent services control point (ISCP) via a switching transfer point (STP). At least some of the calls are then controlled through the switches using data received from a database in the ISCP.

In recent years, a number of new service features have been provided by the AIN. For example, U.S. Pat. No. 5,592,533 to McHenry, et al. discloses a personal communication service registration system and method. The system effects registration for routing a telephone call to a subscriber's personal telephone number service in an integrated wired and wireless communication network by utilizing at least one land line terminal located in a public gathering place. In a manual version of this system, an adjunct registration device is situated at the site of the subscriber premises terminal, and registration in the ISCP of the AIN of the wireline system is effected by subscriber actuation of the adjunct device. In an automated version of this system, the registration device at the site of the termination includes a transceiver for emitting a periodic low power and a limited range scanning signal to detect the presence of a smart portable registration device carried by the subscriber.

In addition, U.S. Pat. No. 5,664,005 to Emery et al. discloses a personal communications service using wireline/wireless integration. This system connects to and controls processing of calls to a personal communication service (PCS) subscriber's wireless handset via a home-based station or a wireless communications network. Depending on its current location, the subscriber's handset automatically registers with the base station of the wireline network or with a mobility controller of the wireless network. A new registration takes place in a wireline network when the handset comes within range of the base station, thereby causing this station to update the subscriber's home location register in a database of the AIN. Similarly, when a handset first registers with a mobility controller, that controller updates the subscriber's home location register in the database of the AIN. In response to calls directed to the subscriber, the AIN accesses the home location register to determine the current location where the handset is registered. The AIN then uses the data to route the call to the current location.

The AIN and cellular system for implementing the PCS service of '005 patent is shown in FIG. 1. This system uses an AIN-type architecture together with elements of a mobile communication system, such as a cellular radio-telephone network. This system provides wireline communication services via one or more central or end office switches, such as the class 4/5 switch 10, that are located throughout a state or region served by a telephone company (TELCO) providing the PCS. Local telephone lines connect the central office switch 10 to individual telephone or device-compatible terminals in each geographic area, for example to the Plain Old Telephone Service (POTS) telephone 12 and a PCS base station 14. This system also provides the wireless communication services via radio links using frequencies assigned to cellular communications networks.

The central office switch 10 of the '005 patent connects via trunk circuits 16, 18 to one or more cellular Mobile Switching Centers (MSCs) 20 and PCS Mobility Controllers (MCs) 22. Each central office switch also connects via trunk circuits to one or more remote central offices. The trunk circuits carry large numbers of telephone calls between central office switches and/or between a central office switch and the MSCs 20 and MCs 22. Also, each central office has a Common Channel Inter-office Signaling (CCIS) type data link 24 connected to a Signaling Transfer Point (STP) 28. CCIS type data links 30 and 32 provide data communication for service processing between the MSCs 20, MCs 22 and the STP 28. Also, a CCIS packet switched data link 34 connects the STP 28 to an ISCP 36.

Each MSC and MC of the '005 patent connects to antennas for a number of cell sites to provide wireless communication services to wireless cellular mobile communication terminals 40 and PCS portable terminals 42. Operation of the MSCs of the mobile or radio network is controlled entirely within the radio-link communication network.

The most common type of mobile radio link communication network is the wireless cellular radio telecommunications network or mobile telephone system. The cellular telecommunications industry has developed standards which when implemented allow automatic handoff from one cellular network to another during an established call, and to allow handoff from one system to another while having incoming calls follow the customer to the visited system. The process of handoff is commonly described as roaming. In this wireless network, exchange of registration, authorization, authentication, and validation signaling messages occur between a MSC 20 and the subscriber's wireless terminal 40. These message exchanges occur when a subscriber is on a home MSC or roaming to a different MSC. These messages are based on protocol standards such as GSM or IS-41.

Dedicated trunk lines, generally provided by dedicated land lines, serve as the link between MSCs within the same system or the same cellular provider. Data links connect to the MSC to selectively access a home location register (HLR) 44, a visitor location register (VLR) 46, an equipment identity register (EIR) 48, and an authentication center (AC) 50, all of which are located at the MSC. All four registers may serve more than one MSC. The HLR 44 is the location register to which a user identity is assigned for record purposes, such as subscriber information, directory number, profile information, and current location. The VLR 46 is the location register, other than the HLR, which an MSC temporarily uses to store and retrieve information regarding a visiting subscriber or user. The differences between the VLR and the HLR are insignificant when handoff of a mobile subscriber is limited to the MSCs within a single system or with single provider, since all the subscribers are presumed to be listed in the HLR, and are validated on that basis. The VLR becomes important only when a subscriber who is not listed on the HLR of a cellular provider enters the system and registers. The EIR 48 is the register that maintains the identify of the particular terminal device. The AC 50 is the register that maintains authentication information and validation periods for a particular wireless terminal or subscriber.

Cellular MSC 20 controls communications via a number of macro cells 52. PCS MC 22 controls communications via a number of micro cells 54. The MSCs and MCs are also interconnected with each other by IS-41 data trunks 56, and may be interconnected via voice trunks essentially running in parallel with the IS-41 trunks.

To provide land line type centrex services for a business customer per the '005 patent, the central office switch 10 provides a land line connection 58 to the customer's premises 60. The land line link would actually include a number of telephone lines connected to various types of conventional telephone terminal devices. To provide wireless centrex services to a particular location which may be the same customer premises 60, lines 62 connect the PCS MC 22 to macro cell antennae within the customer's premises.

This system of the '005 patent is designed to process calls directed to a PCS subscriber's single assigned number by retrieving the most current registration data from the ISCP and using that data to route calls to a home base unit 14, MSC 20, or MC 22, whichever is registered last. However, because this system only provides single number telephone service to PCS subscribers, there still exists a need to provide single number telephone service that can be used by non-PCS subscribers as well, integrating both conventional wired and cellular telephone systems. In particular, there exists a need for cellular and wireline telephone subscribers to be able to receive telephone calls over conventional wireless or wireline communications terminals through a single telephone number and also control terminal-specific functions such as activation, calling priority, or the like.

SUMMARY OF THE INVENTION

The present invention substantially departs from the prior art by providing a one-number communications system and service for the purpose of allowing a subscriber to receive calls to designated wireless or wireline communications terminals through the use of a single assigned telephone number. The system of the present invention thus reduces the number of telephone numbers that need to be obtained and managed by both the subscriber and TELCO.

The one-number communications system and service allows for a caller to call a single telephone number for a particular subscriber which can terminate at several different devices or locations, thus increasing the probability of the call being completed to the subscriber.

The one-number communications system and service provides a multi-protocol architecture and inter-operable protocol set that is highly scalable and allows for integrated wireline and wireless services for TELCOs worldwide.

The one-number communications system and service allows for a calling priority scheme to be set and subsequently modified for a subscriber's terminals. The calling priority can be set such that a list of wireline or wireless telephones are called, either sequentially or in parallel. The calling priority scheme can also be set to allow a telephone call to be forwarded to a subscriber's voice mail, pager, or other compatible device. The subscriber can also designate both time-of-day and day-of-week calling schedules for the terminals.

The system of the present invention includes a local wireline switch that is coupleable to a conventional wireline terminal and a wireless switch that is coupleable to a conventional wireless terminal. A switched telephone network is provided and coupled between the wireline switch and the wireless switch to thereby define a combined switching arrangement for directing and completing a call to and from the terminals upon receiving routing instructions. A data signaling network is included and coupled to the wireline switch, the wireless switch, and the switched telephone network for controlling switching operations when the call is made.

A database management system is coupled to the data signaling network and accessible to the wireline switch and the wireless switch. The database management system includes a modifiable global location register. The global location register contains a telephone number assigned for use by the subscriber, a plurality of statically or dynamically allocated wireline routing instructions assigned to the telephone number for allowing access to a wireline terminal through the wireline switch, a plurality of statically or dynamically allocated wireless routing instructions assigned to the telephone number for allowing access to a wireless terminal through the combined switching arrangement. Additionally, the global location register includes a calling priority scheme for allowing access to designated terminals at different times and days.

Moreover, the wireline switch includes a mechanism for sending a request message to the database management system requesting routing instructions from the global location register for completing the call to the telephone number. The database management system also includes a mechanism for sending a response message to the wireline switch containing the routing instructions for completing the call to at least one of the terminals.

In order to use the system of the present invention, a permanent telephone number is assigned for use by the subscriber. Wireline routing instructions are assigned to a line of the wireline switch for allowing access to the wireline terminal. The wireless terminal is registered with the wireless switch. Wireless routing instructions are obtained for allowing access to the wireless terminal. The wireline routing instructions and the wireless routing instructions are subsequently assigned to the telephone number to thereby directly associate the wireline terminal with the wireless terminal. The calling priority scheme is assigned to the telephone number in order to designate which terminal to call when a request for call completion is made to the telephone number.

In operation, the system receives an incoming call to the wireline switch requesting call completion to the telephone number. In response to the receipt of the incoming call, a request message is sent over the data signaling network from the wireline switch to the database management system of the global location register requesting the routing instructions for completing the call to the telephone number. In response to the request message, a response message is then sent over the data signaling network from the database management system to the wireline switch containing routing instructions for completing the call over the combined switching arrangement based upon the associated calling priority scheme for completing the call. Lastly, the call is completed over the combined switching arrangement to at least one of the subscriber's terminals by using the routing instructions in the response message.

DESCRIPTION OF THE PREFERRED EMBODIMENT

Figure 2:
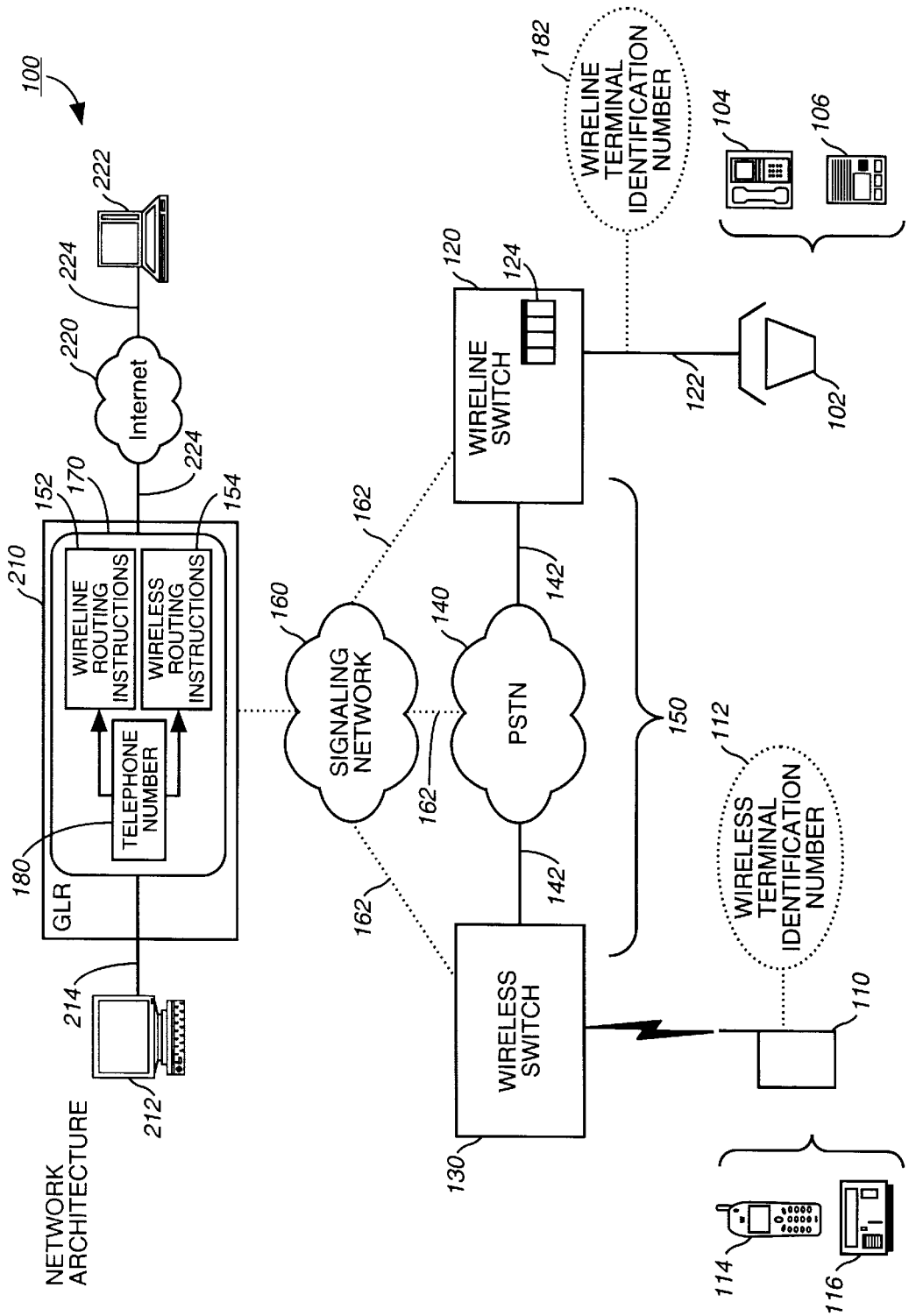
FIG. 2 is a generalized illustration of the network architecture of the present invention for providing one number communications service to wireline and wireless subscribers.

With reference now to the drawings, and in particular, to FIG. 2, the preferred network architecture of the one-number communications system and service is generally designated by reference number 100. The system of the present invention is used with one or more of a subscriber's wireline terminals 102. Conventional wireline terminals such as a wired telephone 104, an answering machine 106, or any other similar line-compatible device known to those skilled in the art can be employed.

In addition, the system of the present invention is used with one or more of a subscriber's wireless terminals 110. Each of the wireless terminals is conventional in design and has a wireless terminal identification number 112. The wireless terminal identification number conventionally includes a pair of unique values. First, the pair includes a mobile identification number (MIN), which is a ten-digit number that is similar to a conventional wireline telephone number and assigned by the TELCO provider. Second, the pair includes an electronic serial number (ESN), which is a 32-bit binary number assigned by the manufacturer of the wireless terminal. Wireline terminals such as a cellular or PCS telephone 114, pager 116, or any other similar wireless-type compatible device known to those skilled in the art can be employed.

In particular, the system of the present invention includes a local wireline switch 120. The function of the wireline switch is to interconnect subscriber lines or connect subscriber lines to trunk transmission facilities. The local wireline switch has the capability to send triggers requesting instructions on how to process calls and conduct call set-up to an external service control point or end office. These triggers could be based on line assignment, trunk assignments, dialed digits, or other criteria. The triggers can be fired at various points in a given call model or procedure, such as pre-call, mid-call, post-call, or non-call associated. The wireline switch includes a twisted pair line 122 that is connected to the subscriber's wireline terminal 102

A resident voice mailbox capability 124 is also included as part of the wireline switch 120. The voice mailbox is conventional in design and allows a subscriber to automatically answer a call and receive, delete, save, and reply or forward messages. Although the voice mailbox is shown as a part of the wireline switch, it can also be added to the network as an intelligent peripheral.

A wireless switch 130 is provided. The function of the wireless switch is to interconnect local wireless subscribers through one of a plurality of channels or connect subscriber to the network's trunk transmission facilities. The wireless switch can be a cellular MSC for use with cellular-compatible terminals or a PCS MC for use with PCS-compatible terminals.

Furthermore, the network 100 includes a conventional public switched telephone network (PSTN) 140 that is connected between the wireline switch 120 and the wireless switch 130 with interoffice trunk lines 142. The PSTN 140 allows calls to be routed between remotely positioned switches, thereby allowing a call to be completed between remotely positioned subscribers. In this configuration, the wireline switch 120, wireless switch 130, and PSTN 140 define a combined switching arrangement 150 of service switching points (SSPs) that allows for calls to be directed and completed to and from the subscriber's wireline terminal 102 and the subscriber's wireless terminal 110. The calls are completed through and by the combined switching arrangement using appropriate wireline routing instructions 152 and wireless routing instructions 154 that setup, manage, and release voice circuits.

In order to provide the routing instructions 152, 154 to the SSPs of the combined switching arrangement 150, a data signaling network 160 of interlinked signal transfer points (STPs) is used. The data signaling network 160 is coupled to the wireline switch 120, the wireless switch 130, and the PSTN 140 with SS7 or other comparable signaling links 162. Each STP routes incoming routing instructions to an outgoing link. The data signaling network, acting as the network hub, thereby allows control of switching operations over the combined switching arrangement 150 for routing a call. By the use of the data signaling network 160, wireline routing instructions are sent to allow access to the subscriber's wireline terminal 102 through the wireline switch 120 for completing a local call or through the combined switching arrangement 150 for completing a remote call. Likewise, by use of the data signaling network, wireless routing instructions are sent to allow access to the subscriber's wireless terminal 110 through the wireless switch 130 for completing a local call or through the combined switching arrangement 150 for completing a remote call.

The system of the present invention also includes a computer-resident single-platform or distributed network information database management system 170 (DBMS). The DBMS is coupled to the data signaling network 160 and is accessible to the wireline switch 120 and the wireless switch 130. The DBMS is a storage place for a variety of data such as a subscriber's name and address, billing information, and operating parameters. Complementary operations system support is included to provide for mechanized assistance for subscriber-provisioning activities such as service negotiation, assignment, and billing. Furthermore, service control support through use of the operations system is included to provide for network administration and updates, surveillance monitoring and testing, and troubleshooting.

Figure 3:
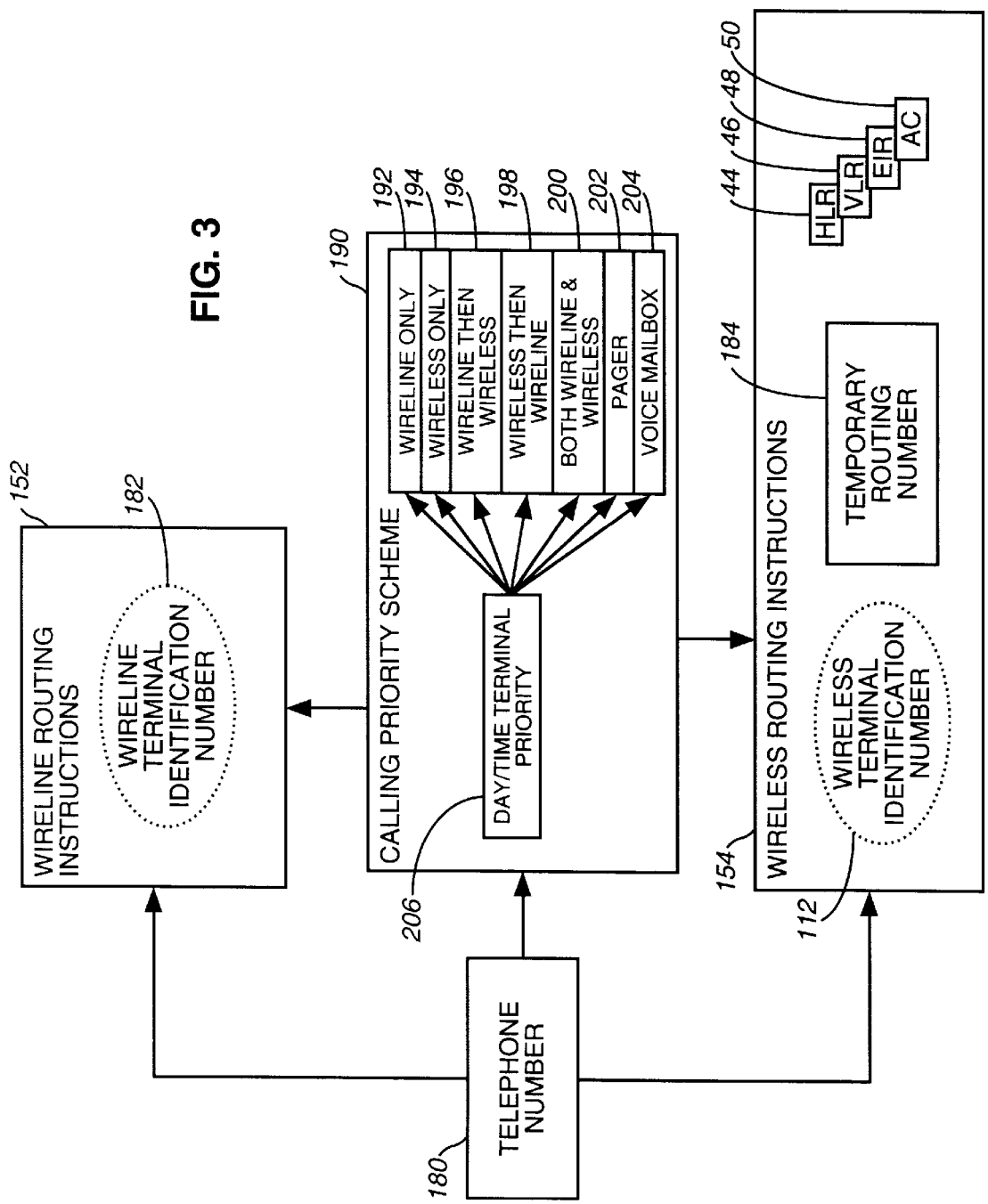
FIG. 3 illustrates the relation of routing instructions and priorities of the system for completing a call to a subscriber's telephone number.

Referring now to FIGS. 2 and 3, operation of the system of the present invention requires that a permanent telephone number 180 be assigned for use by the subscriber. A wireline terminal identification number 182 is also assigned to the line 122 of the wireline switch 120 as to allow access to the wireline terminal 102 through the wireline switch. Preferably, the wireline terminal identification number is the same as the telephone number 180, but a different number, which is transparent to the subscriber, can also be used. To allow for telephone number portability, the telephone number could also be mapped to the line via a number portability database.

In addition, the wireless terminal identification number 112 of wireless terminal 110 is registered with the wireless switch 130 to thus obtain a temporary routing number 184 for allowing access to the wireless terminal through the combined switching arrangement 150. Preferably, the temporary routing number is obtained from the wireless switch only when a request made through the data signaling network 160 in order to maximize channel usage. The wireline terminal identification number 182 and the wireless terminal identification number 112 are subsequently assigned to the telephone number 180. As a consequence, the subscriber's wireline terminal and wireless terminal are directly associated with and accessible by a single telephone number.

Next, a calling priority scheme 190, formed of a plurality of calling priorities, is assigned to the telephone number 180 in order to designate which of the subscriber's terminals to call when a request for call completion is made to the telephone number. The calling priority scheme can be set to any number of priorities, including call completion to the wireline terminal only 192, call completion to the wireless terminal only 194, call completion to the wireline terminal first and if unsuccessful to the wireless terminal next 196, call completion to the wireless terminal first and if unsuccessful to the wireline terminal next 198, nearly parallel call completion to both the wireless terminal and the wireline terminal 200, call completion to the paper 202, and call completion to the voice mailbox 204. Although these priorities form a basis set for the system 100, other similar priorities can be readily derived and provisioned by those skilled in the art.

Moreover, a time and day priority 206 can also be allocated to allow the subscriber's selected terminals to be active at given days and times. As an example, call completion to the subscriber's wireline terminal only could be designated on Mar. 23, 1998 from 8:00 a.m. to 11:00 a.m., call completion to the subscriber's wireline terminal first and if unsuccessful to the wireline terminal next could be designated on the same day from 11:00 a.m. to 5:00 p.m., and call completion to the subscriber's voice mailbox could be designated on the same day from 5:00 p.m. to 12:00 p.m. A default priority scheme for the subscriber can also be provided for use. These designations thus allow a caller to call a telephone number for a particular subscriber which may terminate to several different devices or locations, thus increasing the probability of that subscriber being located. Other calling priority schemes or algorithms could be specified to determine the order in which call terminations should be attempted to the terminals.

The telephone number 180, calling priority scheme 190, and routing instructions 152, 154 used for completing the call are stored in the DBMS 170. The stored wireline routing instructions 152 include the wireline terminal identification number 182. The stored wireless routing instructions 154 include the wireless terminal identification number 112, and temporary routing number 184.

Figure 1:
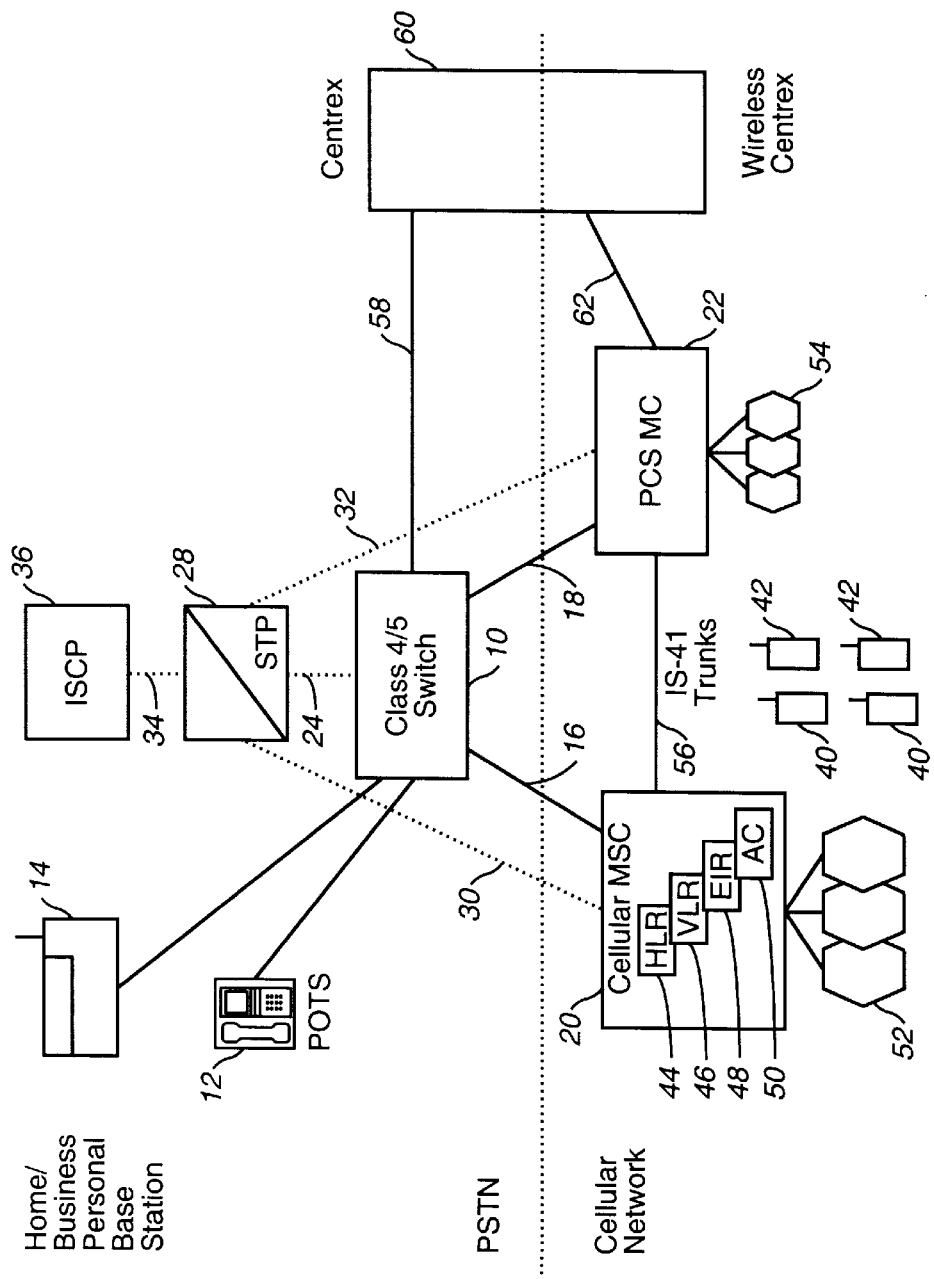
FIG. 1 is a generalized illustration of a prior art communications architecture for providing one number communication services for PCS subscribers.

Additionally, the wireless routing instructions stored on the DBMS 170 includes all or a subset of subscriber profile information that is stored in the HLR 44, VLR 46, EIR 48, and AC 50 of FIG. 1. The DBMS includes the associated functionality for processing this profile information. The conventional information contained in these registers include identification of a wireless terminal, current location of the subscriber, validation period, and authentication information. Preferably, the DBMS includes the capability of providing HLR and VLR functionality and optionally providing AC functionality and EIR functionality. When stored in the DBMS, the information from these registers is now accessible to both the wireless and wireline portions of the system 100. When the telephone number 180 and the associated wireline routing instructions 152, wireless routing instructions 154 and calling priority scheme 190 are stored on the DBMS, a modifiable global location register (GLR) 210 is defined for the system 100 as shown in FIG. 2.

The GLR includes multi-protocol support for receiving a variety of message types, such as those structured in accordance with IS-41, PCS 1900, GSM, AIN, CS-1/CS-2 and FR. Incoming messages are translated into a generic message protocol before GLR-specific processing occurs. Outgoing messages are translated from the generic message protocol into the required protocol type as previously set forth.

The information contained in the GLR 210 is modifiable by a TELCO operator through a workstation 212 that is coupled to the DBMS 170 with communication link 214, thereby providing a service management system (SMS). Through use of the SMS, a TELCO operator can add new telephone numbers for subscribers and other associated billing and service information.

Since many subscribers will want to control their services directly, the system 100 includes a mechanism for allowing them to update selected information, such as the calling priority scheme 190 contained in the GLR. Access to the DBMS by a subscriber can be performed through use of a universal customer interface (UCI) that is coupled to the GLR. For example, the present invention can include a voice driven menu-system for allowing access to the information in the DBMS system via the use of terminals 102, 110 having dual-tone multi-frequency (DTMF) capability. Alternatively, if the DBMS is accessible as a web-based server process, a subscriber could use a conventional web browser client to perform modifications over the Internet 220 through use of computer 222 that is connected to the GLR 210 with communication links 224.

Figure 4:
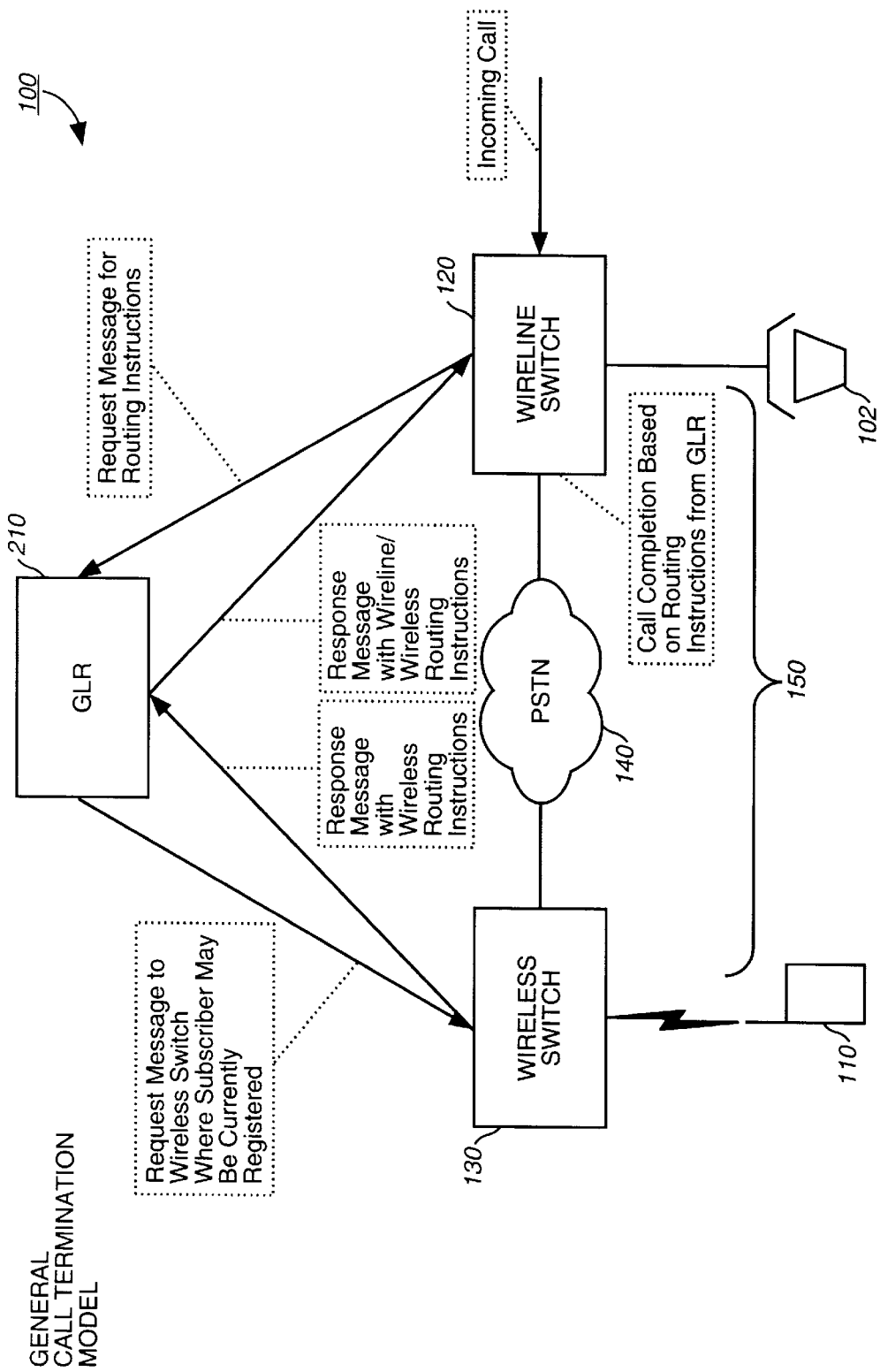
FIG. 4 illustrates a generalized model for terminating a call of the system.

A generalized call termination model for the system 100 is shown in FIG. 4. During operation of the system 100, an incoming call is received by the wireline switch 120. Upon receiving the incoming call to the subscriber's telephone number, a trigger is raised in the local wireline switch, and the wireline switch then sends a message to the GLR 210 requesting routing instructions. If the call is to be completed to the subscriber's wireline terminal 102, the GLR responds with the appropriate wireline routing instructions 152. If the call is to be completed to the subscriber's wireless terminal 110, the GLR sends a message to the wireless switch to determine if the subscriber is currently registered. If the subscriber is registered, then the GLR sends the appropriate wireless standard messages, such as the IS-41 ROUTEREQ message or GSM send-routing-info message to the wireless switch where the wireless terminal is registered. The wireless switch 130 then responds back to the GLR 210 with wireless routing instructions. The GLR then responds to the previously received trigger message by forwarding the wireless routing instructions to the wireline switch 120, thereby directing the wireline switch to complete the call through the combined switching arrangement 150. The wireline switch then completes the call based on the routing instructions from the GLR 210. If the response from the wireless switch is successful, but a collision occurs at the wireless switch 130 after the call is routed there, then standard wireless protocol messages are used to redirect the instructions.

Figure 5:
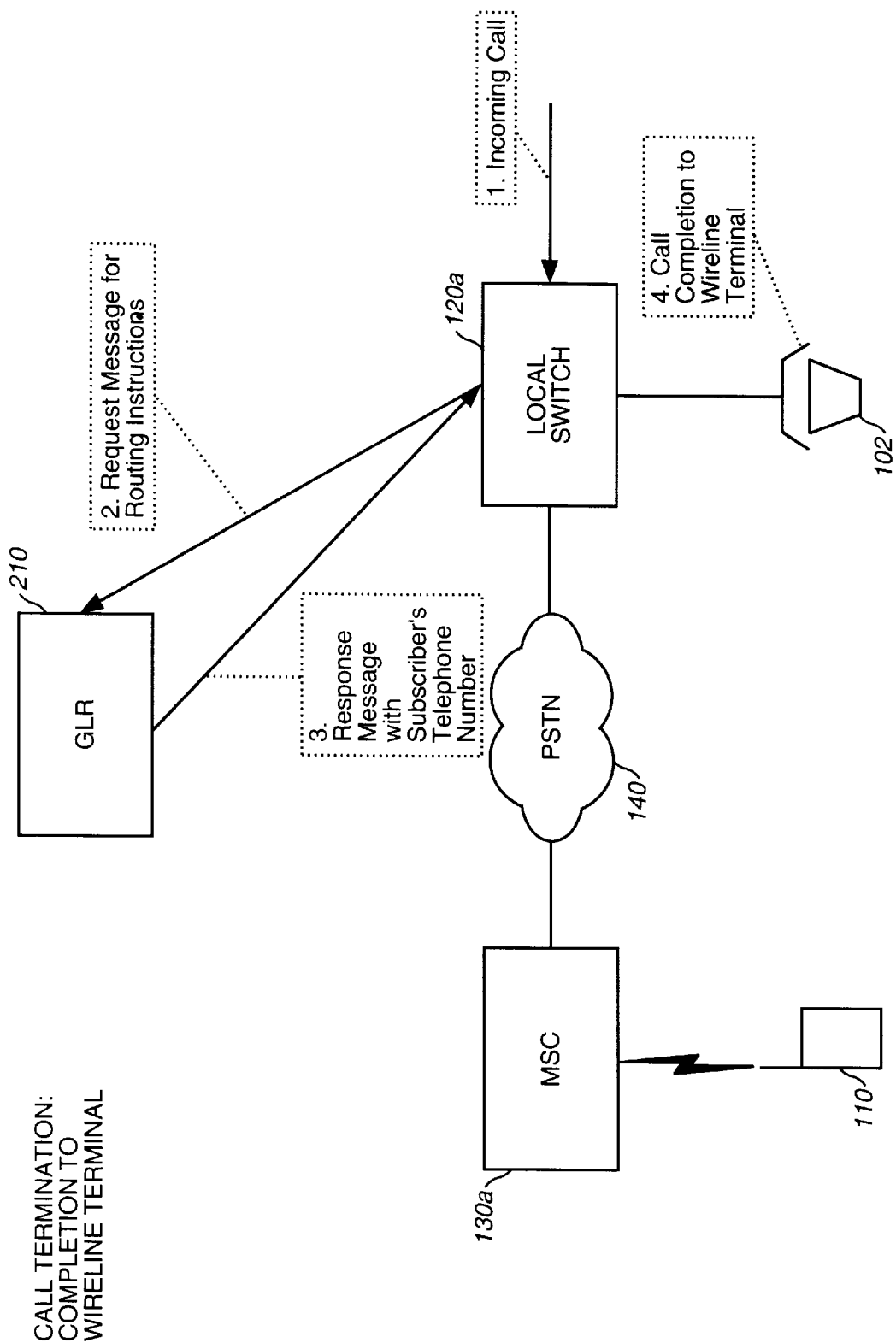
FIG. 5 illustrates a procedure for completing an incoming call to a wireline terminal of the system.

The procedure for terminating a call to the subscriber's wireline terminal 102 is shown in FIG. 5. Here, the wireline switch 120 is a conventional local class 4/5 switch 120a, and the wireless switch 130 is depicted as an MSC 130a. Upon receiving an incoming call to the subscriber's telephone number, local switch 120a sends a request message to the GLR 210 for routing instructions. Based upon receipt of this message, the GLR responds to the local switch with a wireline routing instruction 152 containing the subscriber's telephone number, or alternatively, the wireline terminal identification number 182, as shown in FIG. 3. Now, the local switch completes the call to the subscriber's wireline terminal 102.

Figure 6:
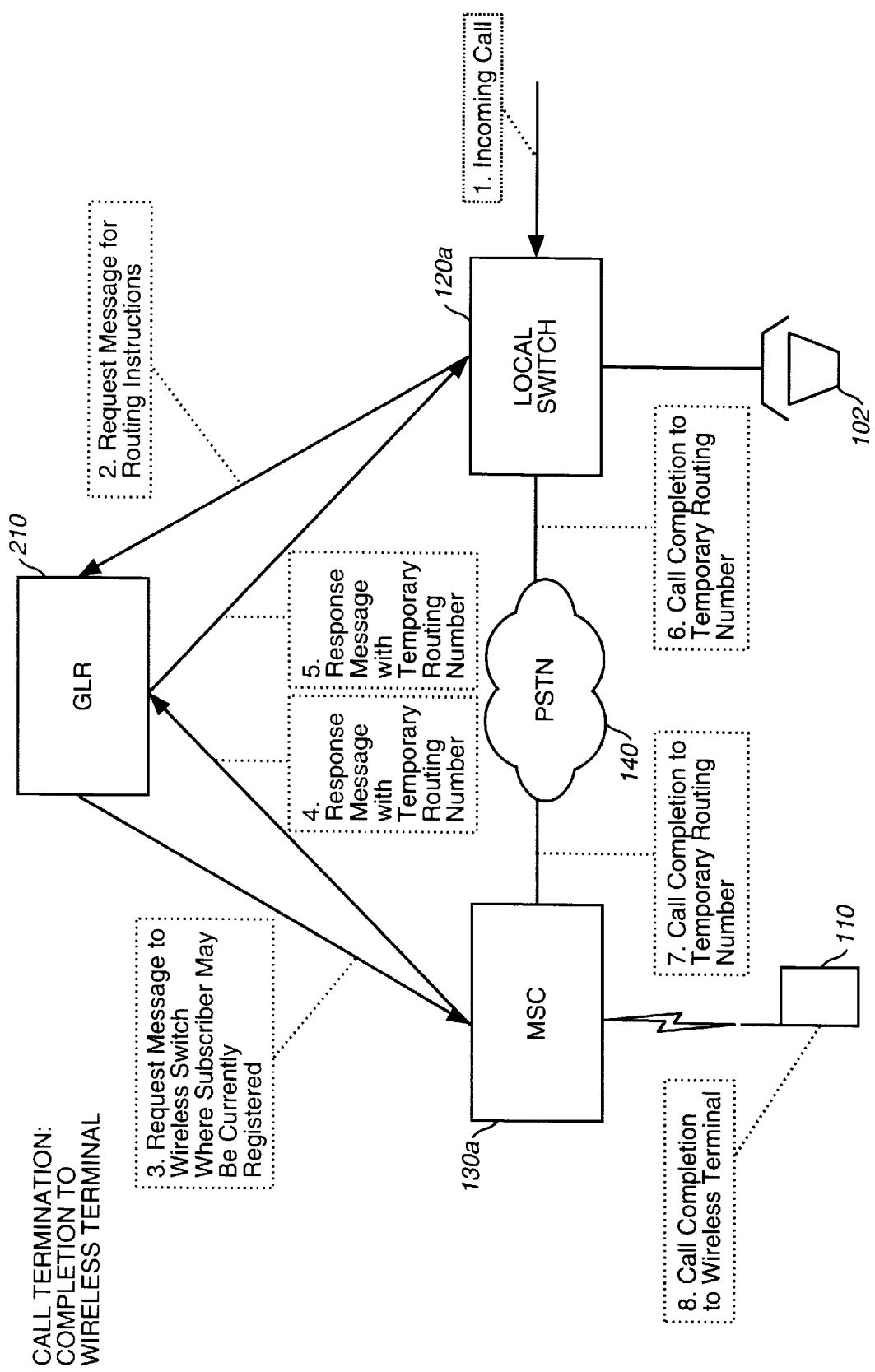
FIG. 6 illustrates a procedure for completing an incoming call to a wireless terminal of the system.

The procedure for terminating a call to the subscriber's wireless terminal is shown in FIG. 6. Upon receiving an incoming call to the subscriber's telephone number, local switch 120a sends a request message to the GLR 210 for routing instructions. Based upon receipt of this message, the GLR 210 then sends a message to the local MSC 130a to determine if the subscriber is currently registered. When the MSC determines that the subscriber is currently registered, it responds with a wireless routing instruction 154 containing a temporary routing number 184 for completing the call, as shown in FIG. 3. The GLR then forwards the wireless routing instruction containing the temporary routing number to the local switch. The local switch then uses the temporary routing number to route the call to the MSC through the combined switching arrangement 150 and thereby allow completion of the call to the subscriber's wireless terminal 110.

Figure 7:
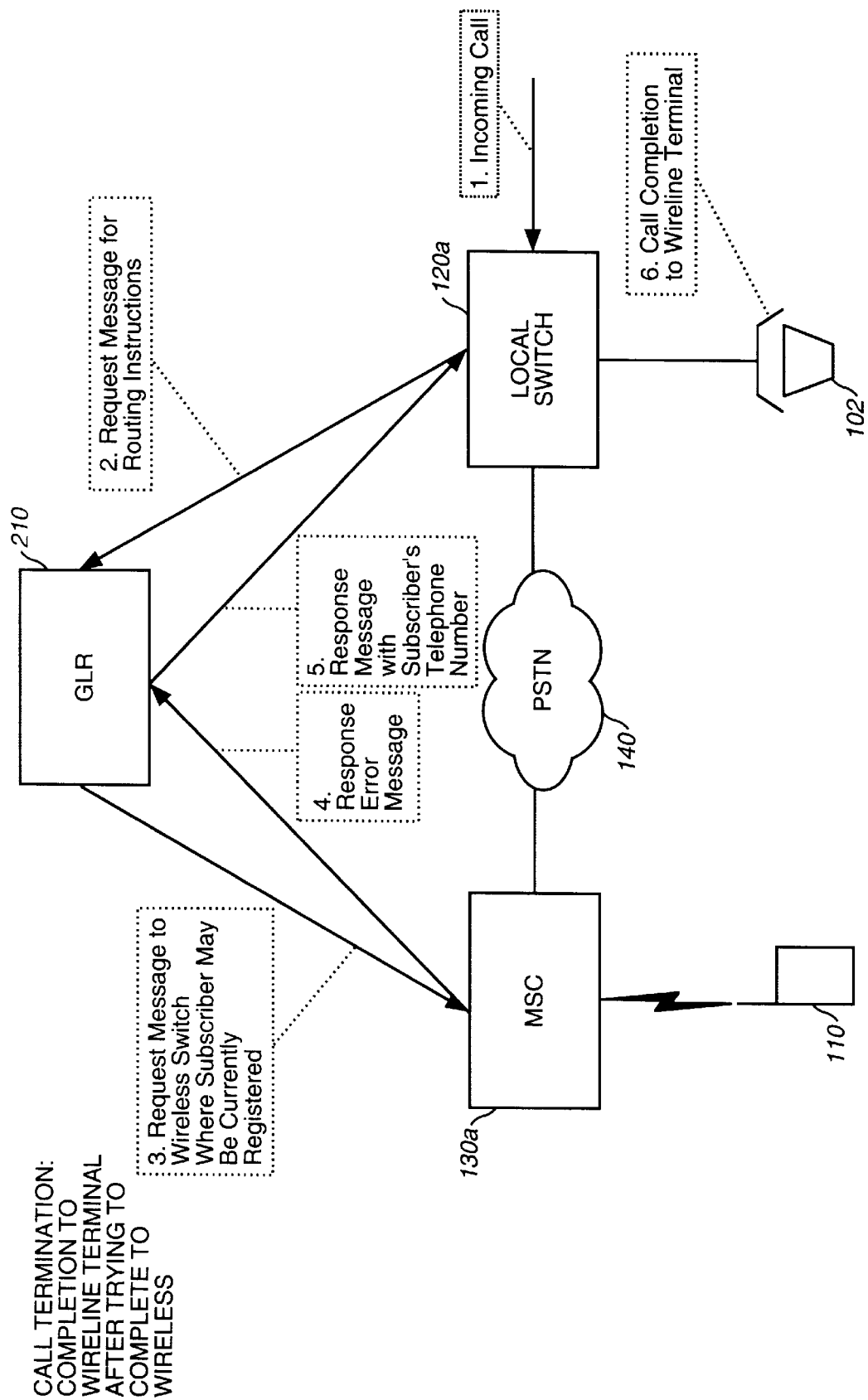
FIG. 7 illustrates a procedure for completing an incoming call to a wireline terminal after first trying to complete the call to a wireless terminal of the system.

The procedure for terminating a call to a wireline terminal after first trying to complete the call to a wireless terminal is shown in FIG. 7. Upon receiving an incoming call to the subscriber's telephone number, local switch 120a sends a request message to the GLR 210 for routing instructions. Based upon receipt of this message, the GLR then sends a message to the local MSC 130a to determine if the subscriber is currently registered. When MSC determines that the subscriber is not currently registered, it responds with a wireless routing instruction containing an error message. Since the subscriber was not registered, and the subscriber has designated that the subscriber's wireline terminal should be called next, the GLR sends a response back to the local switch with a wireline routing instruction 152 containing the subscriber's telephone number or wireline terminal identification number 154, as shown in FIG. 3. Upon receipt of this message from the GLR, the local switch completes the call to the subscriber's wireline terminal.

The call termination procedures as shown in FIGS. 4–7 in combination with the calling priority scheme 190 of FIG. 3 form a basis upon which other differing call termination procedures may be readily ascertained. The system 100 can also be used by solely wireline subscribers or solely wireless subscribers. In either of these cases, only certain information contained in the calling priority scheme related to the subscriber's terminal type would be accessible by the subscriber.

Call origination from the subscriber's wireless terminal can be accomplished in two ways. First, as result of terminal registration, a subset of the subscriber's profile information is sent from the GLR to the MSC, and the MSC can then route the call directly based on consulting this subscriber profile. Second, the MSC can have a wireless trigger set on the wireless terminal, instructing the MSC to first send a signaling message to the GLR containing the telephone number dialed. In this case, the GLR is set up to provide additional services, such as translating the dialed telephone number into some other telephone number. Then, the GLR responds to the MSC with the wireless routing instructions containing the telephone number where the MSC should route the call.

Call origination from the subscriber's wireline terminal is accomplished in an analogous fashion. First, the local switch can handle an outgoing call from the wireline terminal as usual. Second, the local switch can send a message to the GLR as a result of a trigger and request routing instructions. In the this case, the GLR can make a decision based on the dialed telephone number and subscriber provisioning information loaded into the GLR to determine a destination number. The GLR then responds to the local switch with the wireline routing instructions containing the telephone number where the local switch should route the call.

What is claimed is:

1. A one-number communications service system for a subscriber comprising:

a local wireline switch having a line coupleable to a wireline terminal;

a wireless switch coupleable to a wireless terminal;

a switched telephone network coupled between the wireline switch and the wireless switch to thereby define a combined switching arrangement for directing and completing a call to and from the terminals upon receiving routing instructions;

a database management system coupled to a data signaling network and accessible to the wireline switch and the wireless switch, the database management system having a telephone number assigned for use by the subscriber, a plurality of wireline routing instructions assigned to the telephone number for allowing access to the wireline terminal through the wireline switch, a plurality of wireless routing instructions assigned to the telephone number for allowing access to the wireless terminal through the combined switching arrangement, and said database management system further comprising:

means for sending the wireline routing instructions to the wireline switch;

means for requesting a routing number from the wireless switch for completing the call through the combined switching arrangement;

means for storing the routing number as part of the wireline routing instructions; and means for sending the wireless routing instructions to the wireline switch;

said data signaling network coupled to the wireline switch, the wireless switch, and the switched telephone network for sending respective routing instructions therefor for controlling switching operations when the call is made to the telephone number.

2. The one-number communications service system as set forth in claim 1 and further comprising a wireline terminal for the subscriber.

3. The one-number communications service system as set forth in claim 1 and further comprising a wireline terminal for the subscriber and wherein the wireline terminal is selected from the group consisting of a wireline telephone and an answering machine.

4. The one-number communications service system as set forth in claim 1 and further comprising a wireless terminal for the subscriber.

5. The one-number communications service system as set forth in claim 1 and further comprising a wireless terminal for the subscriber and wherein the wireline terminal is selected from the group consisting of a wireline cellular telephone and a pager.

6. The one-number communications service system as set forth in claim 1 wherein the wireline routing instructions of the database management system include a wireline terminal identification number for allowing access to a wireline terminal through the wireline switch.

7. The one-number communications service system as set forth in claim 1 wherein the wireless routing instructions include:
- a wireless terminal identification number for allowing access to a wireless terminal through the wireless switch; and
- a routing number for allowing access to a wireless terminal through the combined switching arrangement.

8. The one-number communications service system as set forth in claim 1 wherein the database management system includes a calling priority scheme assigned to the telephone number in order to designate which terminal to call when a request for call completion is made to the telephone number.

9. The one-number communications service system as set forth in claim 1:
- wherein the database management system includes a calling priority scheme assigned to the telephone number in order to designate which terminal to call when a request for call completion is made to the telephone number; and
- wherein the calling priority scheme is selected from the group consisting of call completion to the wireline terminal only, call completion to the wireless terminal only, call completion to the wireline terminal first and if unsuccessful to the wireless terminal next, call completion to the wireless terminal first and if unsuccessful to the wireline terminal next, and call completion to both the wireless terminal and the wireline terminal.

10. The one-number communications service system as set forth in claim 1:
- wherein the database management system includes a calling priority scheme assigned to the telephone number in order to designate which terminal to call when a request for call completion is made to the telephone number; and
- wherein the calling priority scheme is set to allow call completion to at least one of the terminals at a designated time of day and day of week.

11. The one-number communications service system as set forth in claim 1:
- wherein the database management system includes a calling priority scheme assigned to the telephone number in order to designate which terminal to call when a request for call completion is made to the telephone number; and
- further including means for updating the calling priority scheme based upon the subscriber's direction.

12. The one-number communications service system as set forth in claim 1 wherein the database management system includes:
- means for assigning the telephone number for use by the subscriber;
- means for assigning the wireline routing instructions and the wireless routing instructions to the telephone number to thereby directly associate the terminals;
- means for assigning a calling priority scheme to the telephone number for designating which terminal to call when a request for call completion is made to the telephone number; and
- means for storing the telephone number, the respective routing, instructions, and the calling priority scheme therein to thereby define a modifiable global location register.

13. The one-number communications service system as set forth in claim 1 wherein the wireline switch includes means for assigning a wireline terminal identification number to the line thereof to thereby obtain a plurality of wireline routing instructions for allowing access to the wireline terminal.

14. The one-number communications service system as set forth in claim 1 wherein the wireless switch includes means for registering a wireless terminal identification number therewith and thereby obtain a plurality of wireless routing instructions for allowing access to the wireless terminal through the combined switching arrangement.

15. The one-number communications service system as set forth in claim 1 wherein the wireline switch includes:
- means for receiving an incoming call requesting call completion to the telephone number;
- means for requesting the respective routing instructions from the database management system for completing the call to the telephone number; and
- means for completing the call to the wireline terminal using the wireline routing instructions.

16. The one-number communications service system as set forth in claim 1 wherein the wireless switch includes:
- means for receiving a request for a routing number from the global location register for completing the call through the combined switching arrangement; and
- means for sending the routing number to the global location register.

17. The one-number communications service system as set forth in claim 1 wherein the combined switching arrangement includes means for completing the call to the wireless terminal using the wireless routing instructions.

18. A method for operating a one-number communications service for a subscriber in a combination wireless and wireline communications system, the steps of the method comprising:
- assigning a telephone number for use by the subscriber;
- assigning a wireline terminal identification number to a line of a wireline switch and thereby obtaining a plurality of wireline routing instructions for allowing access to a wireline terminal through the wireline switch;
- registering a wireless terminal identification number of a wireless terminal with a wireless switch and thereby obtaining a plurality of wireless routing instructions for allowing access to a wireless terminal through the wireline switch and the wireless switch;
- assigning the wireline routing instructions and the wireless routing instructions to the telephone number to thereby directly associate the terminals;
- assigning a calling priority scheme to the telephone number for designating which terminal to call when a request for call completion is made to the telephone number;
- storing the telephone number, the respective routing instructions, and the calling priority scheme in a database management system to thereby define a modifiable global location register;
- receiving an incoming call to the wireline switch requesting call completion to the telephone number;
- in response to the incoming call at the wireline switch, requesting the respective routing instructions from the global location register for completing the call to the telephone number;
- in response to the request for the routing instructions, and if the calling priority scheme designates call completion to the wireline terminal, sending the wireline routing instructions from the global location register to the wireline switch;

in response to the request for the routing instructions, and if the calling priority scheme designates call completion to the wireless terminal, requesting a routing number from the wireless switch for completing the call through the combined switching arrangement, in response to the request for the routing number, sending the routing number from the wireless switch to the global location register, and upon receiving the routing number at the global location register, storing the routing number in the global location register as part of the wireline routing instructions, and then sending the wireless routing instructions from the global location register to the wireline switch; and upon receiving the respective routing instructions at the wireline switch, completing the call to the wireline terminal through the wireline switch using the wireline routing instructions and completing the call to the wireless terminal through the combined switching arrangement using the wireless routing instructions.

19. A method for operating a one-number communications service for a subscriber in a combination wireless and wireline communications system, the steps of the method comprising:

providing a wireline terminal for the subscriber;

providing a wireless terminal for the subscriber having a wireless terminal identification number assigned thereto;

providing a local wireline switch having a line coupled to the wireline terminal;

providing a wireless switch;

providing a switched telephone network coupled between the wireline switch and the wireless switch to thereby define a combined switching arrangement for directing and completing a call to and from the terminals upon receiving routing instructions;

providing a data signaling network coupled to the wireline switch, the wireless switch, and the switched telephone network for controlling switching operations when the call is made;

providing a database management system coupled to the data signaling network and accessible to the wireline switch and the wireless switch;

assigning a telephone number for use by the subscriber;

assigning a wireline terminal identification number to the line of the wireline switch and thereby obtaining a plurality of wireline routing instructions for allowing access to the wireline terminal through the wireline switch;

registering the wireless terminal identification number of the wireless terminal with the wireless switch and thereby obtaining a plurality of wireless routing instructions for allowing access to the wireless terminal through the combined switching arrangement;

assigning the wireline routing instructions and the wireless routing instructions to the telephone number to thereby directly associate the terminals;

assigning a calling priority scheme to the telephone number for designating which terminal to call when a request for call completion is made to the telephone number;

storing the telephone number, the routing instructions, and the calling priority scheme in the database management system to thereby define a modifiable global location register;

receiving an incoming call to the wireline switch requesting call completion to the telephone number;

in response to the incoming call at the wireline switch, requesting the routing instructions from the global location register over the data signaling network for completing the call to the telephone number;

in response to the request for the routing instructions, and if the calling priority scheme designates call completion to the wireline terminal, sending the wireline routing instructions from the global location register over the data signaling network to the wireline switch;

in response to the request for the routing instructions, and if the calling priority scheme designates call completion to the wireless terminal, requesting a routing number from the wireless switch over the data signaling network for completing the call through the combined switching arrangement, in response to the request for the routing number, sending the routing number from the wireless switch over the data signaling network to the global location register, and upon receiving the routing number at the global location register, storing the routing number in the global location register as part of the wireline routing instructions, and then sending the wireless routing instructions from the global location register over the data signaling network to the wireline switch; and upon receiving the routing instructions at the wireline switch, completing the call to the wireline terminal through the wireline switch using the wireline routing instructions and completing the call to the wireless terminal through the combined switching arrangement using the wireless routing instructions.

20. The method for operating a one-number communications service as set forth in claim 12:

and further providing means for recording incoming calls for later playback by the subscriber to thereby define a voice mailbox terminal; and completing the call to the voice mailbox terminal using the wireline routing instructions.

\* \* \* \* \*